United States Patent
Eriksson (10) Patent No.: US 6,840,717 B2
(45) Date of Patent: Jan. 11, 2005

(54) ROTATABLE TOOL HAVING A REPLACEABLE CUTTING HEAD AT THE CHIP REMOVING, FREE END OF THE TOOL

(75) Inventor: Henrik Eriksson, Alunda (SE)

(73) Assignee: Sandvik AB, Sandviken (SE)

( * ) Notice: Subject to any disclaimer, the term of this patent is extended or adjusted under 35 U.S.C. 154(b) by 106 days.

(21) Appl. No.: 10/161,640

(22) Filed: Jun. 5, 2002

(65) Prior Publication Data

US 2003/0002932 A1 Jan. 2, 2003

(30) Foreign Application Priority Data

Jun. 6, 2001 (SE) .............................................. 0101965

(51) Int. Cl.⁷ .............................................. B23B 51/02
(52) U.S. Cl. ...................... 408/1 R; 408/144; 408/230; 408/713
(58) Field of Search ................................ 408/1 R, 144, 408/56, 57, 59, 226, 227, 231, 232, 230, 713

(56) References Cited

U.S. PATENT DOCUMENTS

| | | | |
|---|---|---|---|
| 3,548,688 A | * 12/1970 | Kuch | 408/230 |
| 5,957,631 A | 9/1999 | Hecht | |
| 5,988,953 A | 11/1999 | Berglund et al. | |
| 6,012,881 A | * 1/2000 | Scheer | 408/227 |
| 6,071,046 A | 6/2000 | Hecht | |
| 6,315,504 B1 | 11/2001 | Sekiguchi et al. | |
| 6,485,235 B1 | * 11/2002 | Mast et al. | 408/1 R |
| 6,506,003 B1 | * 1/2003 | Erickson | 408/226 |

FOREIGN PATENT DOCUMENTS

| | | |
|---|---|---|
| DE | 198 34 635 | 2/2000 |
| EP | 1 034 864 | 9/2000 |
| JP | 2001/198011 | 7/2000 |

* cited by examiner

*Primary Examiner*—Daniel W. Howell
(74) *Attorney, Agent, or Firm*—Burns, Doane, Swecker & Mathis, LLP (57) ABSTRACT

A rotatable tool includes a shaft and a cutting head mounted thereto. The shaft defines a longitudinal axis of rotation and has a seat formed at a front end thereof which includes a first engagement surface. The cutting head is attached on the seat and includes a second engagement surface engaging the first engagement surface for longitudinally locking the cutting head to the shaft. The first and second engagement surfaces include respective first and second support surfaces which together form a planar interface, the interface defining a contact line when viewed longitudinally toward a front end of the tool. The contact line intersects an outer periphery of the cutting head at a point. The contact line extends from the point in a direction forming an acute angle with a radius that intersects the point. The contact line is disposed rotationally ahead of the radius with reference to rotation of the tool. The cutting head is attached to the shaft in response to relative rotation therebetween, whereupon respective longitudinal undercuts formed by the support surfaces engage one another, and a snap action occurs between respective portions of the engagement surfaces, to resist longitudinal and rotational dislodgement of the cutting head.

14 Claims, 6 Drawing Sheets

ROTATABLE TOOL HAVING A REPLACEABLE CUTTING HEAD AT THE CHIP REMOVING, FREE END OF THE TOOL

This application claims priority under 35 U.S.C. §§ 119 and/or 365 to patent application Ser. No. 0101965-2 filed in Sweden on Jun. 6, 2001.

TECHNICAL FIELD OF THE INVENTION

The present invention relates to a rotatable tool having a replaceable cutting head at the chip removing, free end of the tool. The tool also comprises a shaft having a seat, in which the cutting head is intended to be received. The shaft has members with the help of which chips generated by the cutting head can be transported away. The cutting head has members for chip removing machining, preferably of formed metal. The seat and the replaceable cutting head have mutually cooperating surfaces, which extend in both the longitudinal direction of the tool and a direction transverse to the longitudinal direction of the tool. The invention also relates to the cutting head separately. Preferably, the invention relates to a drill or a milling cutter, and to a method of attaching a cutter head to a shaft.

PRIOR ART

A rotatable tool for chip forming machining having a replaceable cutting head, which is assembled on a shaft of the tool by means of a type of bayonet coupling is previously known from U.S. Pat. No. 5,957,631. In that connection, the replaceable cutting head and the shaft of the tool have cooperating surfaces for transmission of torque, as well as fixing walls which form a dovetail joint when the cutting head is assembled on the shaft.

A tool, a cutting part and a tool body for chip forming machining as well as a method for mounting the cutting part onto the tool body are previously known from U.S. Pat. No. 5,988,953. The cutting part is assembled onto the tool body by means of a bayonet coupling.

AIMS AND FEATURES OF THE INVENTION

A primary aim of the present invention is to provide a rotatable tool of the kind defined above, where the surfaces for the transferring of torque at the same time serve as surfaces for fixing the replaceable cutting head in the axial direction. Thereby, a replaceable cutting head having a relatively small extension in the axial direction is obtained.

Another aim of the present invention is that the fixation of the replaceable cutting head is carried out by a so-called snap function.

Yet another aim of the invention is that portions of the seat are actuated by a force directed towards the center of the tool in an embodiment of the same. Thereby, an improved clamping of the cutting head in the seat is obtained.

Another aim of the present invention is to provide a satisfactory cooling of the cutting head, especially in regard to the front surface thereof.

Yet another aim of the present invention is that the cutting head should be given such geometry that it is relatively simple to manufacture, for instance by pressing, if it is made from cemented carbide.

At least the primary aim of the present invention is realized by means of a rotatable tool that comprises a shaft and a cutting head attached thereto. The shaft defines a longitudinal axis of rotation and includes a chip removal passage for removing chips, and a longitudinal front end forming a seat which includes a first engagement surface that extends generally longitudinally and generally radially with reference to the axis. The cutting head is attached on the seat and includes a second engagement surface which extends generally longitudinally and generally radially. The second engagement surface engages the first engagement surface for longitudinally locking the cutting head to the shaft and for transmitting torque between the shaft and the cutting head. The first and second engagement surfaces include respective first and second support surfaces together forming a planar interface which defines a contact line when viewed longitudinally toward a front end of the tool. The contact line intersects an outer periphery of the cutting head at a point. The contact line extends from the point in a direction forming an acute angle with a radius that intersects the point. The contact line is disposed rotationally ahead of the radius with reference to rotation of the tool during a cutting operation.

The invention also pertains to a replaceable cutting head mountable to a rotatable shaft. The cutting head comprises a body which defines a longitudinal axis and includes a front cutting end and a rear mounting end. The mounting end includes a pair of engagement surfaces facing one another. The cutting end has a cutting edge structure for performing a cutting function when the cutting head is rotated in a direction of rotation about the axis. Each engagement surface extends longitudinally and radially with reference to the axis. Each engagement surface includes a support surface portion which defines a line when viewed longitudinally toward the front cutting end. The line intersects an outer periphery of the cutting head at a point. The line extends from the point in a direction forming an acute angle with a radius of the body that intersects the point. The line is disposed rotationally ahead of the radius with reference to the direction of rotation.

The method further pertains to a method of attaching a cutting head to a shaft by rotating the cutting head, whereupon respective longitudinal undercuts of the cutting head and the shaft engage one another, and a snap action occurs.

BRIEF DESCRIPTION OF THE DRAWINGS

Below, embodiments of the invention will be described, reference being made to the accompanying drawings, where.

DETAILED DESCRIPTION OF PREFERRED EMBODIMENTS OF THE INVENTION

Figure 1:
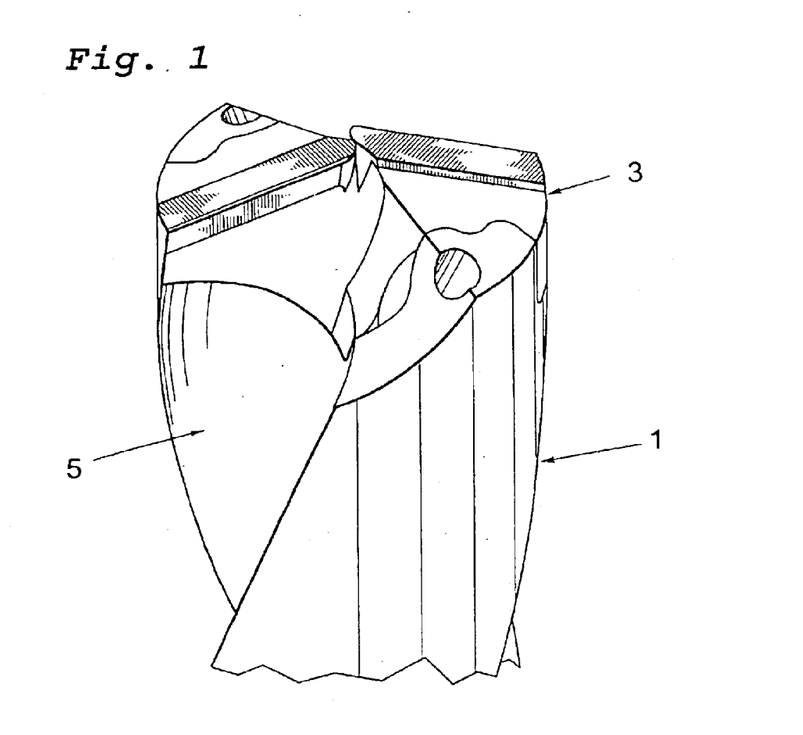
FIG. 1 shows a perspective view of a rotatable tool according to the present invention, in the form of a twist drill, whereby the replaceable cutting head is assembled on the free end of a shaft of the tool.

As is seen in FIG. 1, the twist drill comprises a shaft 1 as well as a replaceable cutting head 3 assembled on the shaft. The shaft 1 is provided with two chip channels 5 which define respective passages for removing the chips which are generated when the cutting head 3 machines a workpiece. Only one of the chip channels 5 is visible in FIG. 1. The twist drill also comprises in a conventional way a fastening part (not shown), which is intended to be attached in a chuck or the like of a machine tool.

Figure 2:
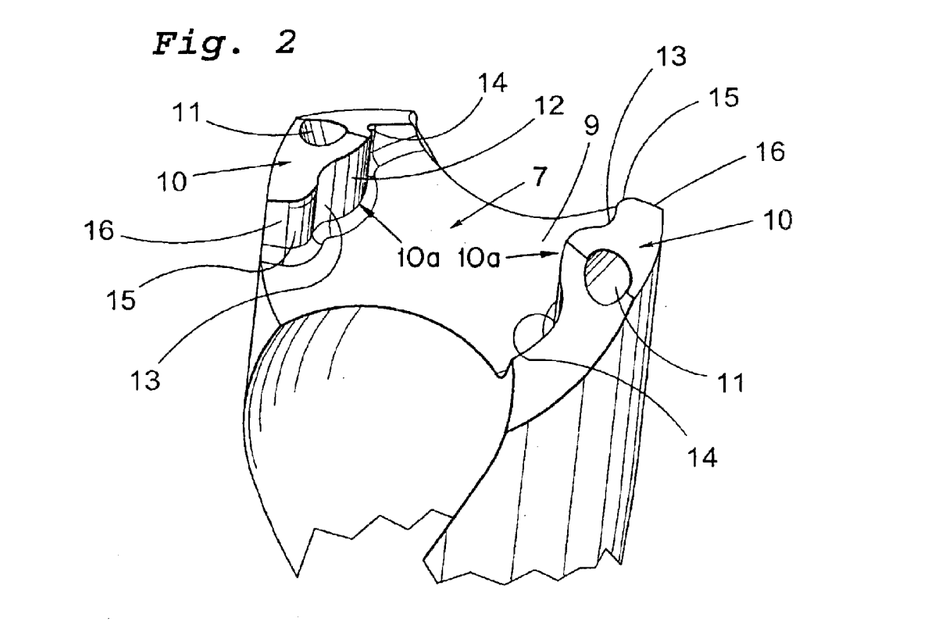
FIG. 2 shows a perspective view of the free end of the shaft when the replaceable cutting head is disassembled.
Figure 3:
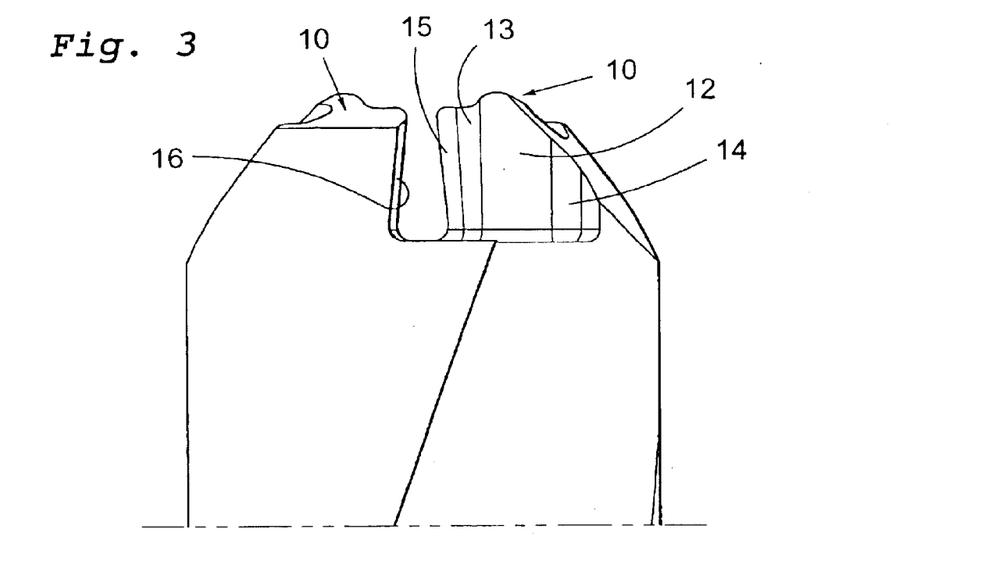
FIG. 3 shows a side view of the shaft when the replaceable cutting head is disassembled.

In FIGS. 2 and 3, a seat 7 arranged in a front longitudinal end of the shaft 1 is shown more in detail, whereby the seat 7 is arranged at the end of the shaft 1 that is opposite from the fastening part. The seat 7 of the shaft 1 comprises a plurality of different surfaces, which shall cooperate in order to give a satisfactory support to the replaceable cutting head 3 in an optimum way when the same is assembled in the seat 7. Thus, the cutting seat comprises a bottom surface 9 as well as two sidewalls 10 arranged diametrically with respect to a longitudinal axis of the shaft 1. In the end surfaces of the sidewalls cooling ducts 11 port. Each of the sidewalls 10 includes two engagement surfaces 10a which face each other. Each engagement surface 10a is generally composed of convex and concave portions, whereby said portions have an axial extension which is parallel to the axial direction of the shaft 1.

Each of those engagement surfaces includes a central first convex portion 12, which is straddled by first and second concave portions 13, 14 that are disposed adjacent respective sides of the convex portion 12. On the side of the first concave portion 13, which is remote from the first convex portion 12, the sidewalls 10 have a second convex portion 15. On the side of the second convex portion 15 which is remote from the first concave portion 13, a first support surface 16 connects with the second convex portion 15, whereby the first support surface 16 has an extension generally inwards towards the center of the tool. As is most clearly seen in FIG. 3, said first support surface 16 has an inclination in the axial direction, the importance of which will be closer explained below in connection with the interaction between the seat 7 and the replaceable cutting bead 3 being described. The first support surface 16 has such an inclination in the axial direction that the respective planes which are defined by said support surface 16 and the bottom surface 9 form an angle with each other which is smaller than 90°. As for the extension of the support surface 16 generally inwards towards the center of the tool, it should be pointed out that such extension does not pass exactly through the center of the twist drill. The significance of this will be illustrated more closely below.

Figure 4:
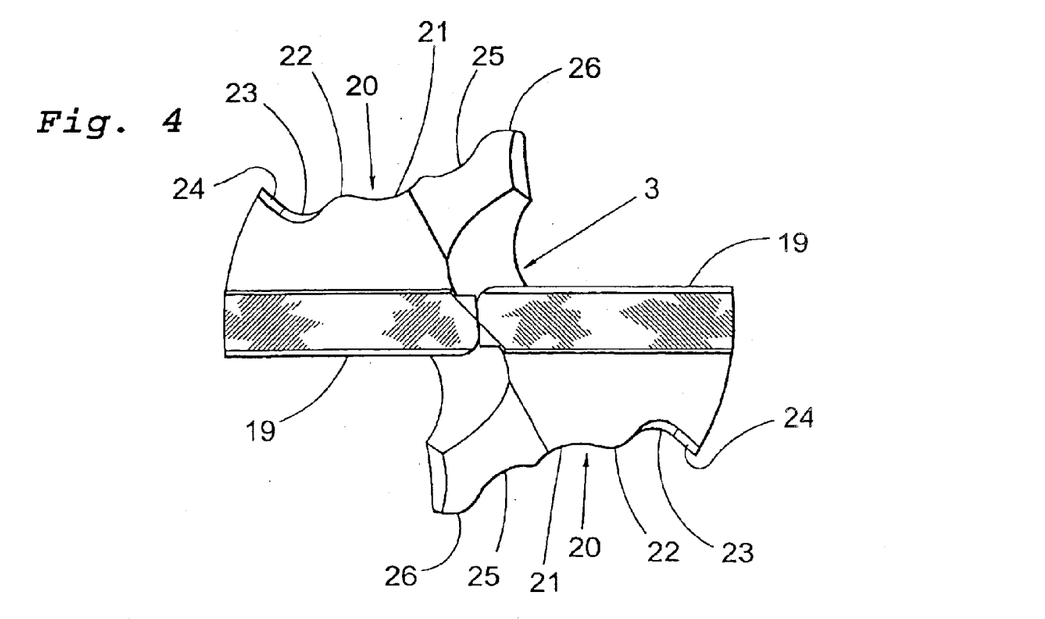
FIG. 4 shows a planar view of a replaceable cutting head according to the present invention.

In FIG. 4, a planar view is shown of the replaceable cutting head 3, which comprises a body having two cutting edges 19 as well as two engagement surfaces 20 facing away from each other. Those engagement surfaces 20 have a complementary shape to respective ones of the mutually facing engagement surfaces 10a of the sidewalls 10. Thus, each of the engagement surfaces 20 is generally composed of convex and concave portions, whereby said portions have an axial extension which is parallel to the axial direction of the shaft 1 when the cutting head 3 is assembled in the seat 7. Thus, each of the engagement surfaces 20 comprises a centrally located third concave portion 21, which is intended to cooperate with the first convex portion 12 of a respective sidewall 10.

Disposed next to the third concave portion 21 in a direction towards the outer circumference of the cutting head 3, is a third convex portion 22, which is intended to be located exactly opposite the first concave portion 13 of the respective sidewall 10.

Disposed next to the third convex portion 22, in a direction towards the outer circumference of the cutting head 3, is a fourth concave portion 23, which is intended to be located exactly opposite the second convex portion 15 of the respective sidewalls 10.

Situated next to the fourth concave portion 23, in a direction towards the outer circumference of the cutting head 3, is a second support surface 24, which is intended to cooperate with the first support surface 16 of the respective sidewall 10, and which extends to a forwardly facing front surface 24a of the cutting head. In a way corresponding to the first support surface 16, the second support surface 24 has an extension inwards generally but not exactly towards the tool center when the cutting head 3 is assembled in the seat 7.

Disposed next to the centrally located third concave portion 21, on the side thereof which is remote from the third convex portion 22, is a fifth concave portion 25, which in the assembled position of the cutting head 3 is located exactly opposite the central part of the second concave portion 14. Disposed next to the fifth concave portion 25, on the side thereof which is remote from the third concave portion 21, is a fourth convex portion 26, which in the assembled position of the cutting head 3 is intended to be located exactly opposite the outermost part of the second concave portion 14.

Each of the first and second support surfaces 16, 24 is inclined at an angle relative to the axis of rotation as that axis is viewed in a direction perpendicular thereto (see FIG. 3), the inclination being such that each of the support surfaces 16, 24 forms a longitudinal undercut.

Figure 5:
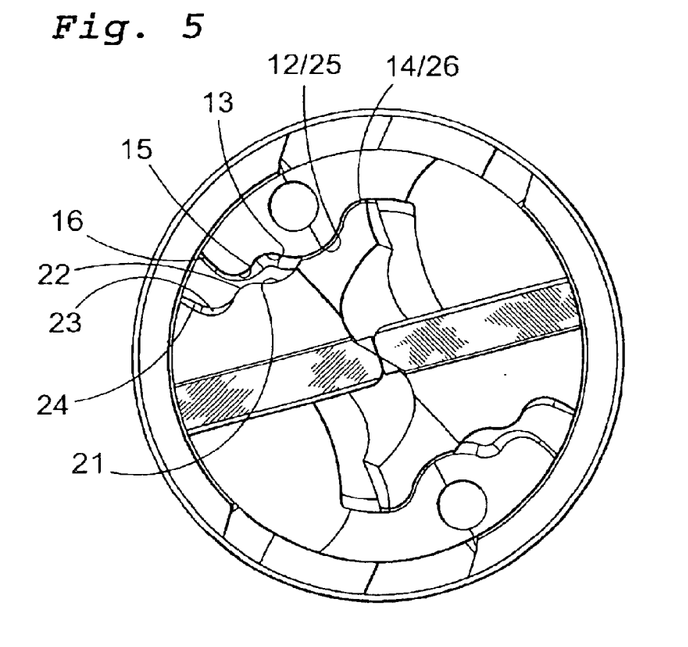
FIG. 5 shows a planar view of the twist drill when the replaceable cutting head is being assembled.
Figure 6:
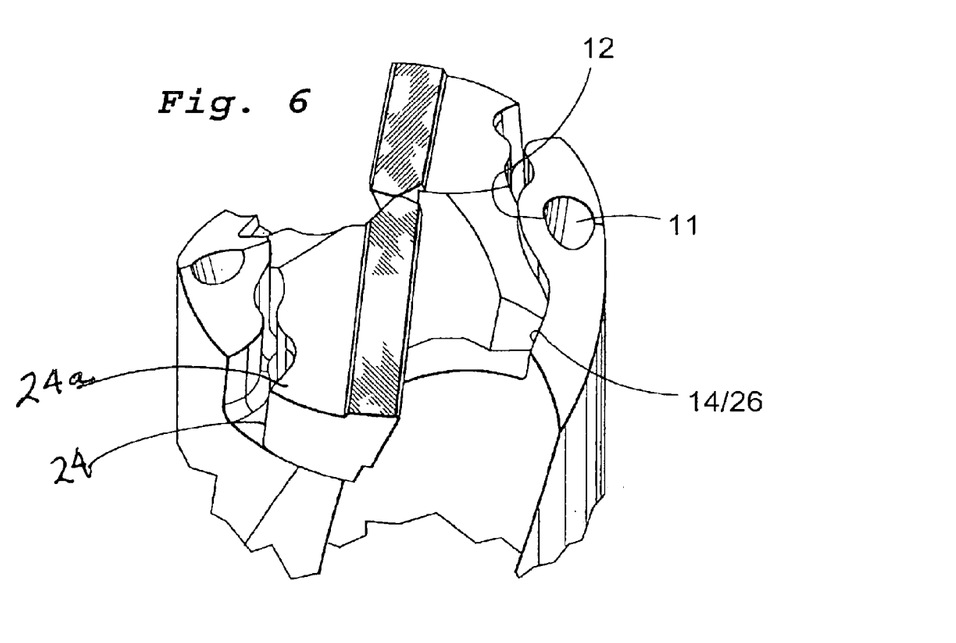
FIG. 6 shows a perspective view of the twist drill at the same stage of assembly of the cutting head as according to FIG. 5.

In FIGS. 5 and 6, an intermediate position of the assembly of the cutting head 3 in the seat 7 is shown. In that connection, the cutting head 3 has been axially inserted into the seat 7, whereby the fifth concave portion 25 is located exactly opposite the first convex portion 12, and the fourth convex portion is located exactly opposite the second concave portion 14. In this connection, it should be pointed out that in the intermediate position according to FIGS. 5 and 6, no satisfactory abutment takes place between the portions which are located exactly opposite each other, but there is always a certain clearance between mutually facing portions which permits turning of the cutting head 3 in relation to the seat 7.

Figure 7:
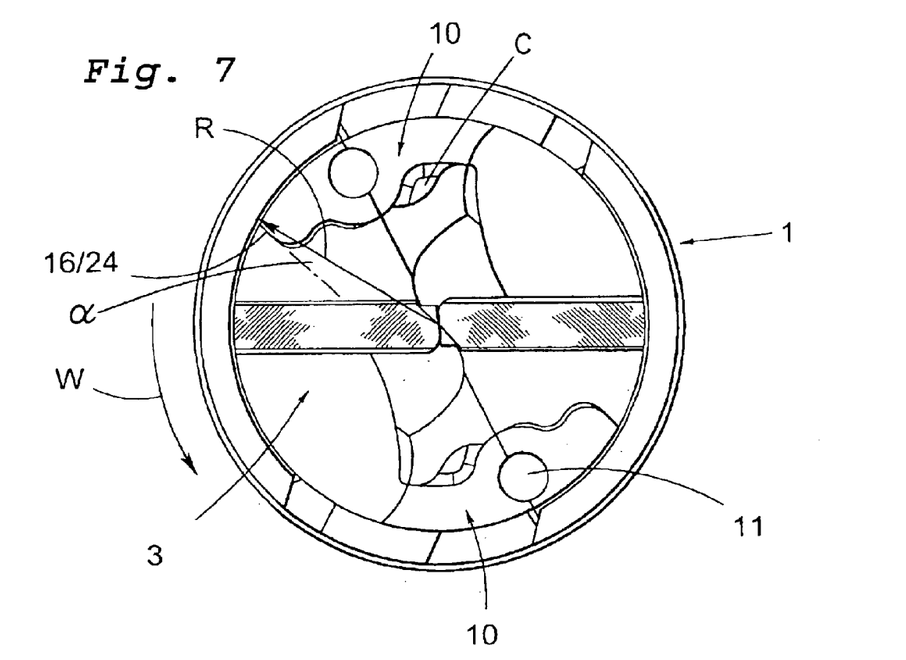
FIG. 7 shows a planar view of the twist drill when the cutting head is assembled.

After turning of the cutting head 3 (clockwise in FIG. 5) to the FIG. 7 position the following occurs:

the centrally located third concave portion 21 of the cutting head 3 will abut against the centrally located first convex portion 12 of the sidewalls 10, the third convex portion 22 of the cutting head 3 will be located exactly opposite the first concave portion 13 of the sidewalls 10, the fourth concave portion 23 of the cutting head 3 will be located exactly opposite the second convex portion 15 of the sidewalls, the fourth convex portion 26 of the cutting head 3 will be located exactly opposite the outer part of the second concave portion 14 of the sidewalls 10, and the fifth concave portion 25 of the cutting head 3 will be located exactly opposite the central part of the second concave portion 14 of the sidewalls 10, i.e., a cavity C between said portions 25, 34 is formed since both are concave.

When the cutting head 3 is entirely turned inwards to the final attached position thereof, also the second support surface 24 of the cutting head 3 will abut against the first support surface 16 of the sidewalls 10. Since the first support surface 16 has an inclination in the axial direction and the second support surface has a corresponding inclination in the assembled position of the cutting head 3, said inclination will prevent movement of the cutting insert in axial direction out of the seat 7 when the support surfaces 16 and 24 are in contact with each other.

That is, since each of the first and second support surfaces 16, 24 form longitudinal undercuts which engage one another, the cutting head cannot move longitudinally away from the shaft. The support surfaces 16, 24 together from a planar interface which defines a contact line when viewed longitudinally toward a front end of the tool, as can be seen in FIG. 7.

As is seen in FIG. 7, the contact line between the first support surface 16 and the second support surface 24 is not located on a radius R of the twist drill which passes through the point of intersection of the contact line 16/24 with the outer periphery or circumference for the full diameter of the cutting head 3. Rather, the contact line 16/24 has such a direction that the distance thereof from the radius R increases in the direction inwards towards the center of the twist drill, i.e., an acute angle α is formed therewith (see FIG. 7). Furthermore, the contact line 16/24 is located on the side of the radius R which goes first in the direction of rotation W of the tool, see FIG. 7. That is, the contact line is disposed rotationally ahead of the radius R with reference to rotation of the tool. This means that the force which the second support surface 24 of the cutting head 3 exerts on the first support surface 16 of the sidewalls 10 entails that the sidewalls 10 are effected by a certain force directed generally towards the center of the twist drill. Accordingly, the sidewalls 10 "pinch" around the cutting head 3, which in a favorable way promotes a satisfactory clamping of the cutting head 3 between the sidewalls 10.

In this connection, it should be mentioned that there should primarily be a satisfactory contact between the support surfaces 16 and 24. From certain aspects, it may be an advantage that satisfactory contact is not established between some of the convex and concave portions of the engagement surfaces 20 and the sidewalls 10. Thereby, the risk of over determination is reduced. In order for a satisfactory clamping of the cutting head 3 to be effected in the seat 7, it is, however, in principle at least necessary that abutment takes place between the third concave portion 21 of the cutting head 3 and the first convex portion 12 of the sidewalls 10 at the same time as abutment take place between the second support surface 24 of the cutting head 3 and the first support surface 16 of the sidewalls.

For manual assembly of the cutting head 3 in the seat 7, a key is required, which may be formed in several different ways. A torque is to be applied to the cutting head 3, by means of said key which torque force the protruding transition portion between the third concave portion 21 and the fifth concave portion 25 of the cutting head 3 past the first convex portion 12 of the sidewalls 10. As said convex portions pass each other, they constitute abutments which make frictional contact with one another. Accordingly, a small outward deflection of the sidewalls 10 normally takes place, i.e., a so-called snap-action. The material of the sidewalls 10 has such an elasticity that it returns to its original state after the convex portions have passed one another and the cutting head 3 has reached its final position of assembly. Thus, a similar force (snap action) is required to return the cutting head to a released state in a counter-clockwise direction.

It is advantageous if the first convex portion 12 of the sidewalls 10 and the corresponding concave portion 21 of the replaceable cutting head 3 are not located exactly opposite each other when the replaceable cutting head is assembled in the seat 7. Rather, there should be a slight offset relationship therebetween so that the first convex portion 12 exerts a pre-stressing force on the replaceable cutting head 3, which ensures that the support surface 24 of the cutting head 3 is pressed against the support surface 16 of the shaft 1, as shown in FIG. 7.

When the cutting head 3 has been consumed, it is disassembled, whereby this takes place by the fact that the cutting head 3 is turned in the opposite direction in comparison with the assembly thereof. Also in this case, a key is used at manual disassembly. A new unconsumed cutting head 3 is then assembled in the way that has been described above.

Figure 8:
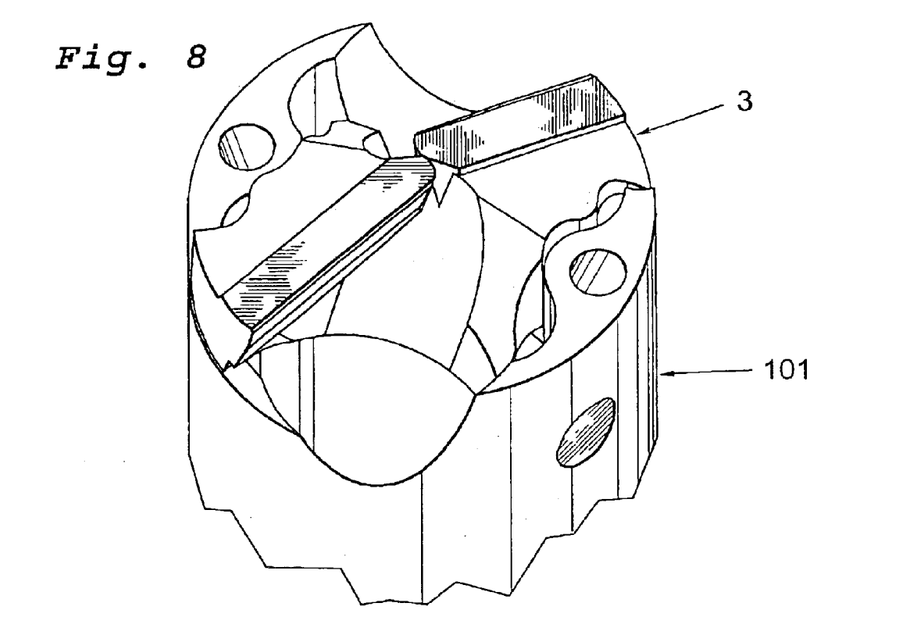
FIG. 8 shows a perspective view of an alternative embodiment of a rotatable tool according to the present invention, in the form of a hollow drill, whereby the replaceable cutting head is assembled on the free end of a shaft of the tool.
Figure 9:
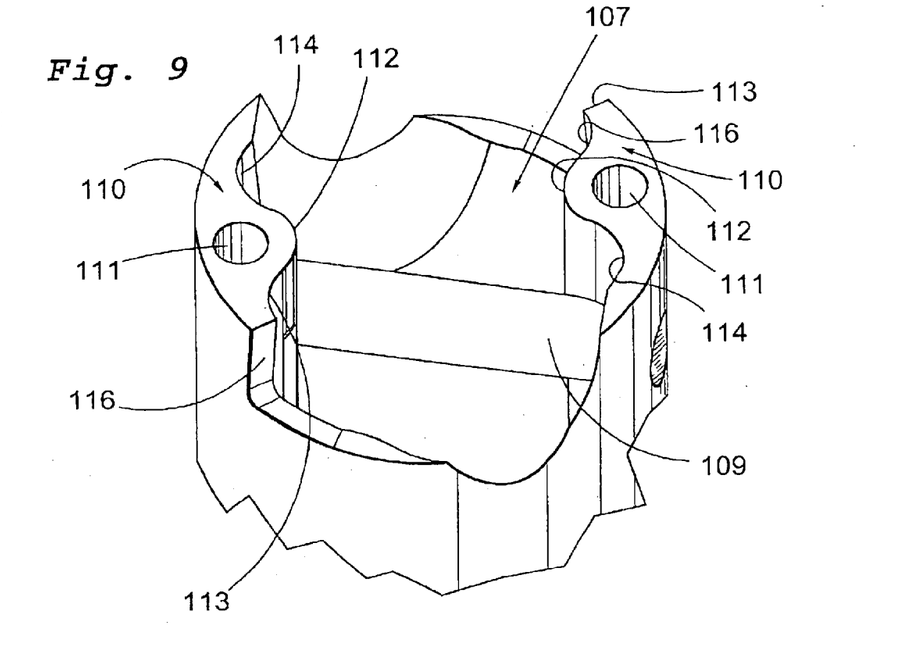
FIG. 9 shows a perspective view of the embodiment according to FIG. 8 of the free end of the shaft when the replaceable cutting head is disassembled.

An alternative embodiment of a rotatable tool according to the present invention, illustrated in FIGS. 8 and 9, relates to a hollow drill that, among other things, differs principally from a twist drill in that the chips generated at the cutting head 3 are removed through an inner passage formed in the tubular shaft 101.

According to a preferred embodiment of the invention, an identical replaceable cutting head 3 is used in the hollow drill according to FIGS. 6 and 9 as in the twist drill according to FIGS. 1–7. The seat 107 is formed differently in the hollow drill than in the twist drill. Thus, the seat 107 of the hollow drill has no bottom surface; rather, a cylindrical pin 109 constitutes an interior support for the replaceable cutting head 3 when the same is assembled in the seat 107.

The two diametrically located sidewalls 110 of the shaft 101 of the hollow drill have a somewhat different design in comparison with the sidewalls 10 of the twist drill. As is most clearly seen in FIG. 9, the surfaces of the sidewalls 110, facing towards each other, are generally composed of convex and concave portions, whereby said portions have an axial extension which is parallel to the axial direction of the shaft 101. The sidewalls 110 have a centrally located first convex portion 112, which is straddled by first and second concave portions 113, 114 disposed adjacent respective sides of the convex portion 112. On the side of the first concave portion 113 which is remote from the first convex portion 112, a first support surface 116 is disposed which has an extension inwards generally towards the center of the tool. Said first support surface 116 has the same inclination in the axial direction as the first support surface 16 of the embodiment according to FIGS. 1–7, therefore reference is made to the relevant parts of the text which describes the design and function of the first support surface 16.

The replaceable cutting head 3 is assembled in the seat 107 of the hollow drill in principally the same way as the assembly in the seat 7 of the twist drill, therefore reference is made to the relevant parts of the description above which relate to the assembly of the cutting head 3 in the seat 7. Also the disassembly is carried out in principally the same way as in the embodiment according to FIGS. 1–7.

Figure 10:
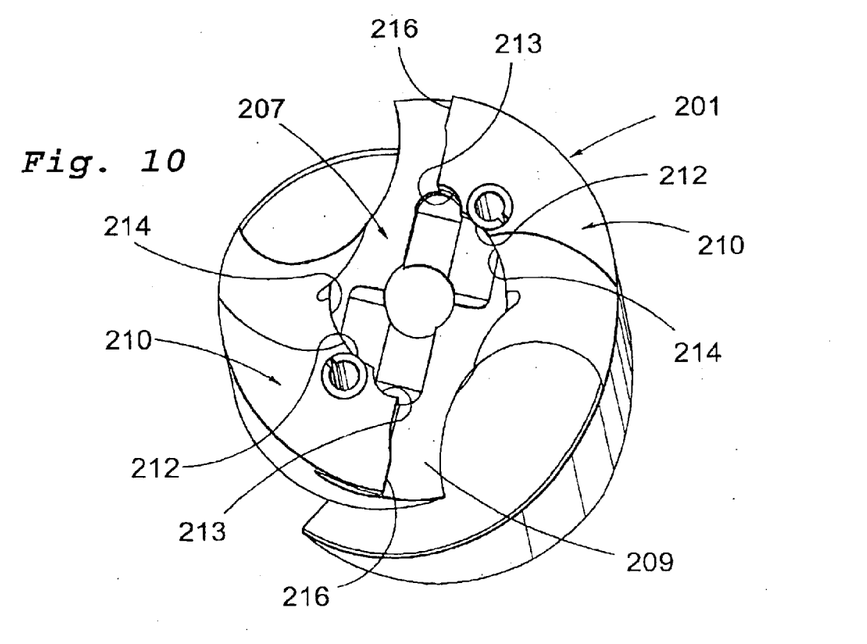
FIG. 10 shows a view in some perspective of an additional alternative embodiment of the shaft for a rotatable tool according to the present invention, whereby the tool is in the form of a twist drill having a tubular pin.
Figure 11:
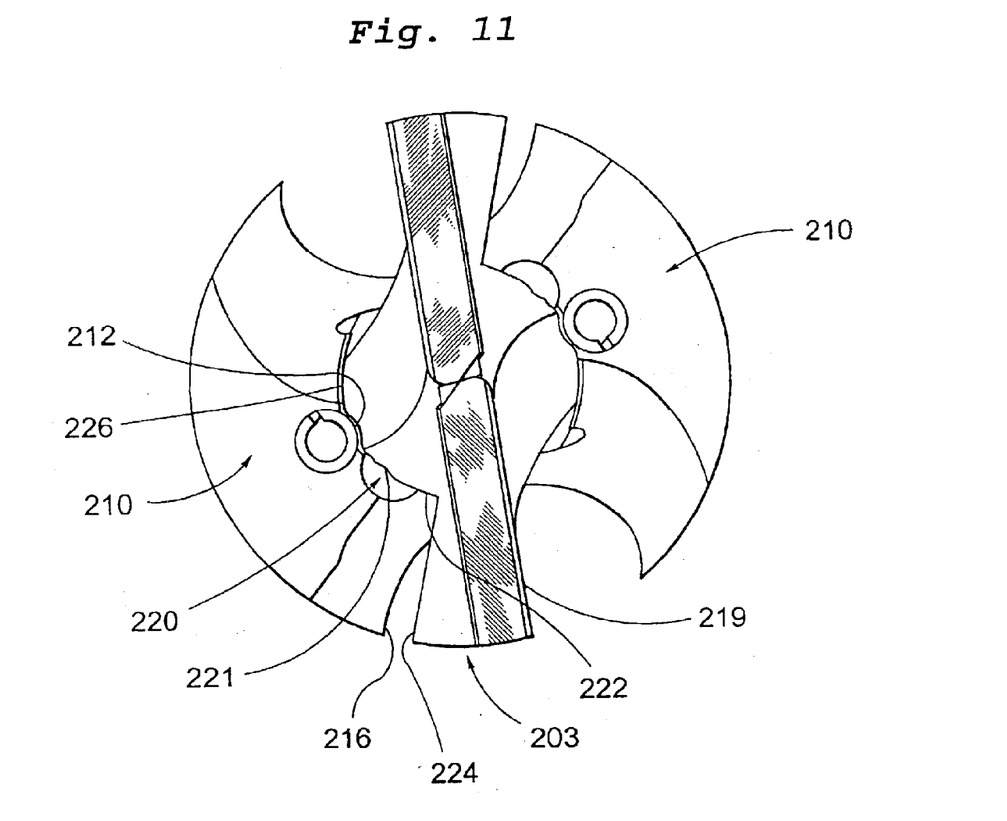
FIG. 11 shows a planar view of the embodiment according to FIG. 10, whereby a replaceable cutting head is being assembled in the appurtenant seat thereof.

In FIGS. 10 and 11, an additional alternative embodiment is shown of a rotatable tool according to the present invention, in the form of a twist drill, where a shaft 201 has two diametrically arranged sidewalls 210, which have an axial extension parallel to the axial direction of the tool. The centrally located first convex portion of each of the sidewalls 210 is defined by a tubular pin 212, which is intended to cooperate via snap-action with a concave portion of the replaceable cutting head 203 when the same is finally assembled in the seat 207 in the embodiment according to FIGS. 10 and 11.

In the corresponding way as at the sidewalls 10; 110 described above, each of the sidewalls 210 in FIGS. 10 and 11 has a first and a second concave portion 213 and 214, respectively, on both sides of the first convex portion/tubular pin 212. Since the tubular pin 212 is provided with an axial slot, it is significantly more elastically compliant than the convex portions 12; 112 of the embodiments described above. This has importance at assembly and disassembly of the replaceable cutting head in the seat. Each of the sidewalls 210 also has a first support surface 216, which in a corresponding way as the support surfaces 16; 116 has an inclination in the axial direction in order to prevent the cutting head 203 from unintentionally falling out of the seat 207.

In FIG. 11, the cutting head 203 is shown during assembly in the seat 207, whereby the cutting head 203 has a somewhat different design in comparison to the cutting head 3. The two engagement surfaces 220 have a centrally located third concave portion 221, which is intended to cooperate with the first convex portion 212 of the sidewalls 210. Disposed adjacent the third concave portion 221, in direction outwards towards the circumference of the full diameter of the cutting head 203, the engagement surfaces 220 have a third convex portion 222, which is intended to be located exactly opposite the first concave portion 213 of the sidewalls 210. In the assembled position of the cutting head 203, the concave portion 213 will serve as a cooling duct in order to supply cooling liquid to the cutting head 203. In connection with the circumference of the cutting head 203, the engagement surfaces 220 have a second support surface 224, which is intended to cooperate with the first support surface 216 of the sidewalls 210. In the corresponding way as for the first support surface 216, the second support surface 224 has an extension inwards generally towards the center of the tool when the cutting head 203 is assembled in the seat 207. In connection with the center portion of the cutting head 203, the engagement surfaces 220 have a fourth convex portion 226, which in the assembled position of the cutting head 203 is intended to be exactly opposite the outermost part of the second concave portion 214.

In the embodiment according to FIGS. 10 and 11, it is advantageous if the tubular pin 212 and the corresponding concave portion of the replaceable cutting head 203 are not located exactly opposite each other when the replaceable cutting head 203 is assembled in the seat 207. The tubular pin 212 should exert a pre-stressing force on the replaceable cutting head 203 which entails that the support surface 224 of the cutting head 203 is pressed against the support surface 216 of the shaft 201 according to FIG. 10.

FEASIBLE MODIFICATIONS OF THE INVENTION

The cutting edges 19; 219 arranged on the cutting head 3; 203 may either be formed in one piece with the cutting head 3; 203 or constitute separate parts which for instance are connected at the tip 3; 203 by soldering. In case the cutting edges 19; 219 are integrated with the cutting head 3; 203, the same is preferably manufactured from cemented carbide, ceramics or another comparatively hard material. It is also feasible that the cutting head is manufactured from a compound material, i.e. that the surface layer consists of a hard material while the core consists of a softer material. In case the cutting edges are arranged on separate cutting inserts, the rest of the cutting head may be manufactured from a suitable steel grade.

The number of cutting edges may vary within the scope of the invention. In the embodiments described above, the number of cutting edges is two, however, within the scope of the present invention, more cutting edges are also conceivable.

In the embodiments described above, the sidewalls 10; 110; 210 have an extension all the way up to the free end of the tool. However, within the scope of the present invention it is also feasible that the cutting head has such a design that the same covers the free end of the tool.

In order to facilitate the compliance of the sidewalls 10; 110; 210, the shaft 1; 101 may be provided with one or more slots, having an axial extension.

In the embodiments described above, the cooling ducts either part in the end surfaces of the sidewalls 10; 110 or are formed as concave portions 213 in the sidewalls 210. However, other designs of the cooling ducts are also feasible within the scope of the inventions, whereby in that context it should be mentioned that it is fully conceivable that the tool lacks cooling ducts for certain applications.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A rotatable tool comprising:
    a shaft defining a longitudinal axis of rotation and including:
        a chip removal passage for removing chips, and
        a longitudinal front end forming a seat, the seat including a first engagement surface extending generally longitudinally and facing generally radially with reference to the axis;
    a cutting head attached on the seat and including a cutting edge structure oriented to define a direction of rotation for performing a cutting operation, and a second engagement surface extending generally longitudinally and facing generally radially, the second engagement surface engaging the first engagement surface for longitudinally locking the cutting head to the shaft and for transmitting torque between the shaft and the cutting head;
    the first and second engagement surfaces including respective first and second support surfaces together forming a planar interface defining a contact line when viewed longitudinally toward a front end of the tool, the contact line intersecting an outer periphery of the cutting head at a point, wherein the contact line extends from the point in a direction forming an acute angle with a radius that intersects the point, the contact line disposed rotationally ahead of the radius with reference to the direction of rotation of the tool during a cutting operation, wherein the cutting head is positionable in an attached state in response to relative rotation between the cutting head and the shaft in one direction about the longitudinal axis, and positionable out of the attached state in response to relative rotation between the cutting head and the shaft in an opposite direction about the longitudinal axis;

wherein the cutting end of the cutting head includes a forwardly facing front surface, and the second support surface extends to the front surface.

2. The tool according to claim 1 wherein each of the first and second engagement surfaces further includes portions shaped convexly and concavely, respectively, as viewed longitudinally toward the front end of the tool, wherein a concave portion and a convex portion of the first engagement surfaces face a convex portion and a concave portion, respectively, of the second engagement surface in the attached state of the cutting head.

3. The tool according to claim 1 wherein the planar interface is formed by first and second support surface portions of the first and second engagement surfaces, respectively, the first support surface portion being inclined relative to the axis of rotation as viewed in a direction perpendicular to the axis to form a longitudinal undercut preventing the cutting head from moving longitudinally away from the shaft.

4. The tool according to claim 3 wherein the seat includes a bottom surface engaged by the cutting head.

5. The tool according to claim 1 wherein the first engagement surface is one of a pair of first engagement surfaces which face one another and which are disposed on walls projecting longitudinally forwardly at the front end of the shaft, wherein the second engagement surface is one of a pair of second engagement surfaces arranged opposite respective ones of the first engagement surfaces.

6. The tool according to claim 1 wherein the first engagement surface includes a convex portion disposed opposite a concave portion of the second engagement surface in the attached state, wherein the concave and convex portions include mutually abutting surface portions resisting rotation of the cutting head out of the attached state.

7. The tool according to claim 6 wherein the convex portion is formed by an elastically flexible tubular pin.

8. A replaceable cutting head mountable to a rotatable shaft, the cutting head comprising a body defining a longitudinal axis and including a front cutting end, and a rear mounting end; the mounting end including a pair of engagement surfaces facing one another; the cutting end having a cutting edge structure for performing a cutting function when the cutting head is rotated in a direction of rotation about the axis; the direction of rotation being defined by an orientation of the cutting edge structure; each engagement surface extending longitudinally and facing generally radially with reference to the axis; each engagement surface including a support surface portion defining a line when viewed longitudinally toward the front cutting end, the line intersecting an outer periphery of the cutting head at a point; wherein the line extends from the point in a direction forming an acute angle with a radius of the body that intersects the point; the line disposed rotationally ahead of the radius with reference to the direction of rotation; wherein the cutting end includes a forwardly facing front surface and each support surface extends to the front surface.

9. The cutting head according to claim 8, wherein each of the engagement surfaces further includes portions shaped convexly and concavely when viewed longitudinally toward the mounting end.

10. The cutting head according to claim 9 wherein each of the support surface portions is inclined relative to the axis as viewed in a direction perpendicular to the axis to form a longitudinal undercut.

11. The cutting head according to claim 8 wherein each of the support surface portions is inclined relative to the axis as viewed in a direction perpendicular to the axis to form a longitudinal undercut.

12. A method of attaching a cutting head to a rotary tool shaft; the shaft and the cutting head defining a longitudinal axis of rotation when interconnected; the shaft including a chip removal passage for removing chips and a longitudinal front end forming a seat; the seat including a pair of first engagement surfaces each extending generally longitudinally and facing generally radially; the cutting head including a pair of second engagement surfaces each extending generally longitudinally and facing generally radially; the method comprising the steps of:

A) inserting the cutting head onto the seat with the pair of first engagement surfaces facing respective ones of the second engagement surfaces and spaced therefrom;

B) imparting relative rotation between the cutting head and the shaft about the longitudinal axis to bring the mutually facing engagement surfaces into engagement by:

B1) causing abutments on the respective mutually facing engagement surfaces to contact one another and frictionally pass one another with a snap action, and B2) causing a support surface on each of the mutually facing engagement surfaces to contact one another, wherein each abutment surface forms a longitudinal undercut preventing longitudinal removal of the cutting head, each pair of contacting support surfaces together forming a planar interface defining a contact line when viewed longitudinally toward a front end of the tool, the contact line intersecting an outer periphery of the tool at a point, wherein the contact line extends from the point in a direction forming an acute angle with a radius that intersects the point, the contact line disposed rotationally ahead of the radius with reference to rotation of the tool during a cutting operation.

13. A rotatable tool comprising:

a shaft defining a longitudinal axis of rotation and including:
 a chip removal passage for removing chips, and
 a longitudinal front end forming a seat, the seat including a first engagement surface extending generally longitudinally and facing generally radially with reference to the axis;

a cutting head attached on the seat and including a second engagement surface extending generally longitudinally and facing generally radially, the second engagement surface engaging the first engagement surface for longitudinally locking the cutting head to the shaft and for transmitting torque between the shaft and the cutting head;

the first and second engagement surfaces including respective first and second support surfaces together forming a planar interface defining a contact line when viewed longitudinally toward a front end of the tool, the contact line intersecting an outer periphery of the cutting head at a point, wherein the contact line extends from the point in a direction forming an acute angle with a radius that intersects the point, the contact line disposed rotationally ahead of the radius with reference to the direction of rotation of the tool during a cutting operation, wherein the cutting head is positionable in an attached state in response to relative rotation between the cutting head and the shaft in one direction about the longitudinal axis, and positionable out of the attached state in response to relative rotation between the cutting head and the shaft in an opposite direction about the longitudinal axis;

wherein the first engagement surface includes a convex portion disposed opposite a concave portion of the second engagement surface in the attached state, wherein the concave and convex portions include mutually abutting surface portions resisting rotation of the cutting head out of the attached state.

14. The tool according to claim 13 wherein the convex portion is formed by an elastically flexible tubular pin.

* * * * *